Patented July 31, 1945

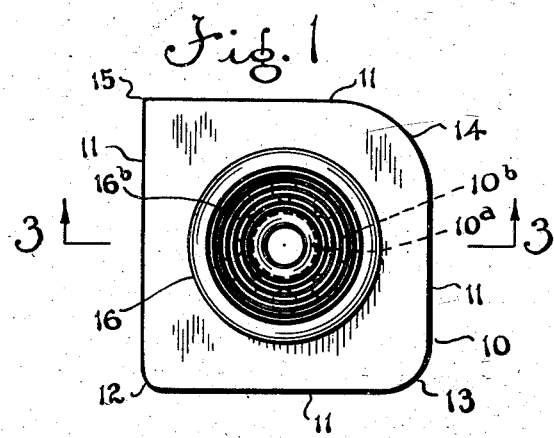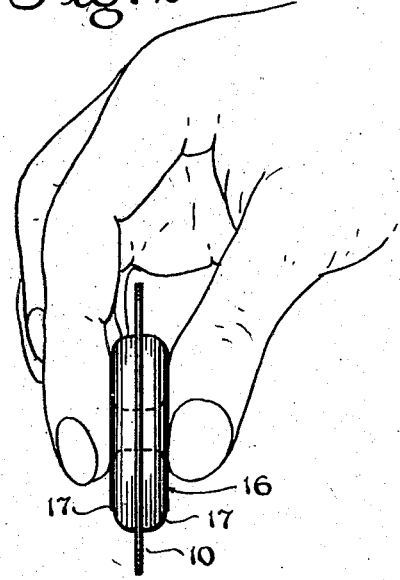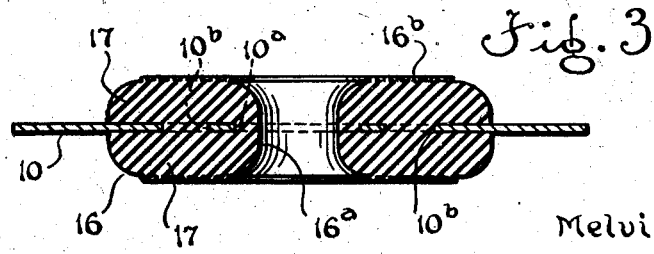

2,380,855

UNITED STATES PATENT OFFICE 2,380,855

SCRAPER

Melvin S. Lower, Ravenna, Ohio

Application February 14, 1944, Serial No. 522,214

3 Claims. (Cl. 15—236)

This invention relates to scrapers of the type adapted to be held in the hand for scraping material from surfaces, and in particular relates to scrapers for cleaning pots and pans or the like.

An object of the invention is to provide a simple, compact scraper of the character described, having non-skid gripping means thereon which will not detract from its compactness, and whereby the scraper is adapted to be held firmly but relatively comfortably between the fingers in use for scraping or cleaning a surface.

Another object of the invention is to provide an improved scraper having novel gripping means thereon of rubber or the like, by which it is adapted to be laid on a surface, with the scraper blade in spaced relation thereto, so as to prevent damaging the finish of the surface.

Still another object of the invention is to provide a scraper of the character described, having improved gripping means of rubber, plastic, or the like bonded to the scraper blade thereof in such a manner as to be substantially integral therewith, whereby the device may be readily kept clean.

These and other objects of the invention will be manifest from the following brief description and the accompanying drawing.

Of the accompanying drawing:

Figure 1 is a plan view of a scraper device embodying the invention.

Figure 2 is an edge view of the device as held between the fingers for use in scraping or cleaning.

Figure 3 is a cross-section taken on line 3—3 of Figure 1.

Referring to the drawing, the numeral 10 designates a flat scraper blade of relatively thin metal, the same being of square outline to provide straight edges 11, 11 for scraping or cleaning flat surfaces or straight sides of cooking utensils, for example. Three corners may be rounded to different radii, as indicated at 12, 13 and 14, and the fourth corner made square as indicated at 15, for scraping in corners of corresponding nature. The blade 10 is made square for convenience and simplicity, but may be of any desired polygonal or similar irregular shape. Any suitable metal may be used for the blade. As a kitchen device, however, it is preferred that it be of corrosion resistant material, such as polished stainless steel.

Centrally of blade 10, is a gripping device 16, which may be of rubber, plastic, or like material, vulcanized or bonded to the blade in a known manner. As best illustrated in Figure 3, the grip 16 may be vulcanized or molded through a central aperture 10a in blade 10, and through a plurality of apertures 10b, 10b arranged around aperture 10a, to adhere the grip securely to the blade and eliminate any possibility of dirt, grime, or moisture lodging between the two.

The grip 16 preferably is formed to provide projecting circular buttons 17, 17 on opposite sides of blade 10, there being a central aperture 16a formed therein for hanging the scraper on a hook or nail when not in use. The outer faces of the buttons 17 may have serrations, grooves, or other suitable configurations formed in the outer faces thereof, as indicated at 16b to provide, together with the central aperture 16a, a substantial non-skid grip for the fingers, as shown in Figure 2. The outer faces of the grip 16 also may be substantially flat, so that the scraper may be laid on the surface of a piece of kitchen equipment, for example, with the blade in spaced relation thereto, and thereby obviate accidental engagement of edges of the blade with said surface to scratch or mar the finish thereof.

In the use of the improved device for scraping or cleaning kitchen utensils, for example, it is held between the fingers substantially as illustrated in Figure 2. In this manner the device is readily adjustable by pivoting it on the fingers, conveniently to present any one of the straight edges 11, or a square or rounded corner, as desired for a particular cleaning or scraping operation. It will also be readily seen by reference to Figure 2 that because of the relatively small size of the blade 10 as compared with the size of the fingers of the user of the scraper, and because the buttons 17 project outwardly of opposite sides of the blade a substantial distance, the grip 16 may be gripped between the fingers as shown with a minimum tendency for the blade edges to contact or cut the fingers.

Modifications of the invention may be resorted to without departing from the spirit thereof or the scope of the appended claims.

What is claimed is:

1. A scraper of the character described comprising a flat blade having scraping edge portions all around the same, and gripping means centrally of said blade, said gripping means providing button-shaped members relatively smaller than said blade and projecting from opposite sides thereof a substantial distance, said button-shaped members having oppositely disposed central recessed portions substantially rounded at the edges thereof, said blade being so proportioned in size that said button-shaped members are adapted to be gripped between the fingers without the edges of the blade necessarily contacting adjacent portions of the fingers, the size of said rounded recessed portions being sufficient to receive substantial portions of the fingers in gripping relation of the same with the button-shaped members.

2. A scraper of the character described, comprising a flat blade of relatively thin material and having scraping edges around the same, said blade having a plurality of apertures therein, and a gripping element attached to said blade and having portions extending through said apertures to adhere to said blade, said gripping element providing button-shaped members relatively smaller than said blade and projecting from opposite sides thereof a substantial distance, said blade being so proportioned in size that said button-shaped members are adapted to be gripped between the fingers without the blade necessarily contacting adjacent portions of the fingers.

3. A scraper of the character described, comprising a flat scraping blade of relatively thin material having at least one scraping edge portion, said blade having a central aperture and a plurality of apertures around the same, and a gripping element attached to said blade and having portions extending through said apertures, said gripping element providing button-shaped members relatively smaller than the blade and projecting from opposite sides thereof a substantial distance, said blade being so proportioned in size that said button-shaped members are adapted to be gripped between the fingers without the blade necessarily contacting adjacent portions of the fingers, said gripping element having an aperture therethrough coaxial with said central aperture of the blade.

MELVIN S. LOWER.